(12) United States Patent
Sandberg

(10) Patent No.: US 6,749,421 B2
(45) Date of Patent: Jun. 15, 2004

(54) PATTY-FORMING APPARATUS

(75) Inventor: Glenn Sandberg, Lockport, IL (US)

(73) Assignee: Formax, Inc., Mokena, IL (US)

( * ) Notice: Subject to any disclaimer, the term of this patent is extended or adjusted under 35 U.S.C. 154(b) by 0 days.

(21) Appl. No.: 10/071,703

(22) Filed: Feb. 8, 2002

(65) Prior Publication Data

US 2003/0152663 A1 Aug. 14, 2003

(51) Int. Cl.$^7$ ............................................. B29C 45/23
(52) U.S. Cl. ..................... 425/556; 53/122; 425/572; 425/574; 425/575; 425/812; 426/513
(58) Field of Search .......................... 425/536, 572, 425/574, 575, 812; 426/513; 53/122

(56) References Cited

U.S. PATENT DOCUMENTS

| | | |
|---|---|---|
| 3,887,964 A | 6/1975 | Richards |
| 3,952,478 A * | 4/1976 | Richards et al. ............... 53/122 |
| 4,182,003 A | 1/1980 | Lamartino et al. |
| 4,187,581 A | 2/1980 | Wagner |
| 4,272,864 A | 6/1981 | Holly |
| 4,329,828 A * | 5/1982 | Wagner ....................... 53/122 |
| 4,338,702 A | 7/1982 | Holly |
| 4,356,595 A | 11/1982 | Sandberg et al. |
| 4,372,008 A | 2/1983 | Sandberg |
| 4,418,446 A | 12/1983 | Sandberg et al. |
| 4,541,143 A | 9/1985 | Holly |
| 4,597,135 A | 7/1986 | Holly et al. |
| 4,608,731 A | 9/1986 | Holly |
| 4,768,941 A | 9/1988 | Wagner |
| 4,821,376 A | 4/1989 | Sandberg |
| 4,872,241 A | 10/1989 | Lindee |
| 5,730,650 A | 3/1998 | Soper |

* cited by examiner

*Primary Examiner*—Tim Heitbrink
(74) *Attorney, Agent, or Firm*—Polit & Erickson, LLC

(57) ABSTRACT

A patty-forming apparatus includes a mold plate having patty-forming cavities and a breather plate arranged over the mold plate. A fill slot is arranged below or above the mold cavities to fill food product into the mold cavity when the mold plate is in a fill position. The breather plate, arranged on a side of the mold plate opposite the fill slot, includes a fill recess open toward the mold plate and arranged to be in registry with the cavities when the mold plate is in the fill position to increase a transverse food product flow area along the longitudinal direction to assist filling of the cavity with food product.

20 Claims, 5 Drawing Sheets

PATTY-FORMING APPARATUS

TECHNICAL FIELD OF THE INVENTION

The present invention relates to food patty-forming machines. The invention particularly relates to an improved filling arrangement for a food patty-forming machine.

BACKGROUND OF THE INVENTION

Food patty-forming, or patty-molding, machines are described for example in U.S. Pat. Nos. 3,952,478; 4,054,967; 4,182,003; and 4,329,828, and PCT published application WO 99/62344, herein incorporated by reference.

In one type of food patty-forming machine a mold plate, having patty-shaped cavities, is reciprocated between a fill position and a knock out position. The cavities are located above or below a food product delivery apparatus. Within the food product delivery apparatus, the food product, such as ground beef or ground poultry, is pumped by a plunger through a manifold and then upwardly or downwardly through a fill slot and eventually into the mold cavities. When the mold plate is in the fill position, food product is delivered under pressure through the fill slot into the cavities, forming patties.

A breather plate is arranged above or below the mold plate. The breather plate includes breather holes that communicate or express air out of the mold cavities while food product is being filled into the cavities from below or above. The breather holes are typically located at a position above the cavities being filled that is distant from the position of the fill slot, so that a uniform patty shape can be achieved as the air within the mold cavities and within the food product is expelled through the breather holes. During filling, the food product delivered through the fill slot advances through a transverse flow area defined by a width and height of the cavity, through the cavity toward the breather holes. After filling of the cavities, the mold plate is then shifted to the knock out position where the mold cavities are extended forward of the breather plate. The patties are then knocked out of the cavities by a knockout mechanism.

The present inventor has recognized that when the formed patties are thin, i.e., formed within cavities of a thin mold plate, such as 0.25 inch thick or thinner mold plates, extreme product pressure is required to fill the cavities. Particularly, the present inventor has recognized that extreme product pressure is required to force cold and stiff food product, particularly ground or whole muscle poultry, through the thin passage provided by the thickness of the thin mold plate. Elevated pressures increase forces on machine components, which in turn increases friction of sliding components. Elevated pressures also contribute to increased occurrence of leaks and spraying.

The present inventor has recognized that it would be advantageous to provide a food patty-forming machine which overcame the above-mentioned drawbacks and produced a food patty having a uniform food density and thickness.

SUMMARY OF THE INVENTION

The invention contemplates an improved food patty-forming machine of the type having a reciprocating mold plate having at least one cavity, the mold plate reciprocated between a fill position and a knock-out position, the cavity filled with food product from a fill slot open to one side of the cavity when the cavity is in the fill position. The improvement comprises the use of a fill recess in registry with the cavity in the fill position, the fill recess allowing an increased flow area for food product to advance within the cavity during filling. Preferably, the fill recess is formed into a face of a breather plate, the breather plate also having breather holes for expelling air from within the cavity during filling.

Preferably, the mold plate includes multiple cavities arranged side-by-side in the transverse direction. The fill slot and fill recess can be common to the cavities.

As the mold plate is moved into its fill position, with the fill slot in registry with the cavities, food product held in the fill recess is forced from the fill recess into the cavities. Further food product is forced through the fill recess, and directly through the cavities, into the cavities until the cavities are filled. As food product is filled into the mold cavities, air is expelled through both the breather holes.

The invention is particularly suitable for machines wherein the breather plate and the fill slot are on opposite sides of the mold plate, although not limited to such machines. Such machines typically utilize the mold plate to seal off the fill slot from atmosphere as the mold plate moves back and forth between the fill position and the knock out position. By forming the fill recess into the breather plate, the advantage of using the mold plate to seal off the fill slot is retained.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
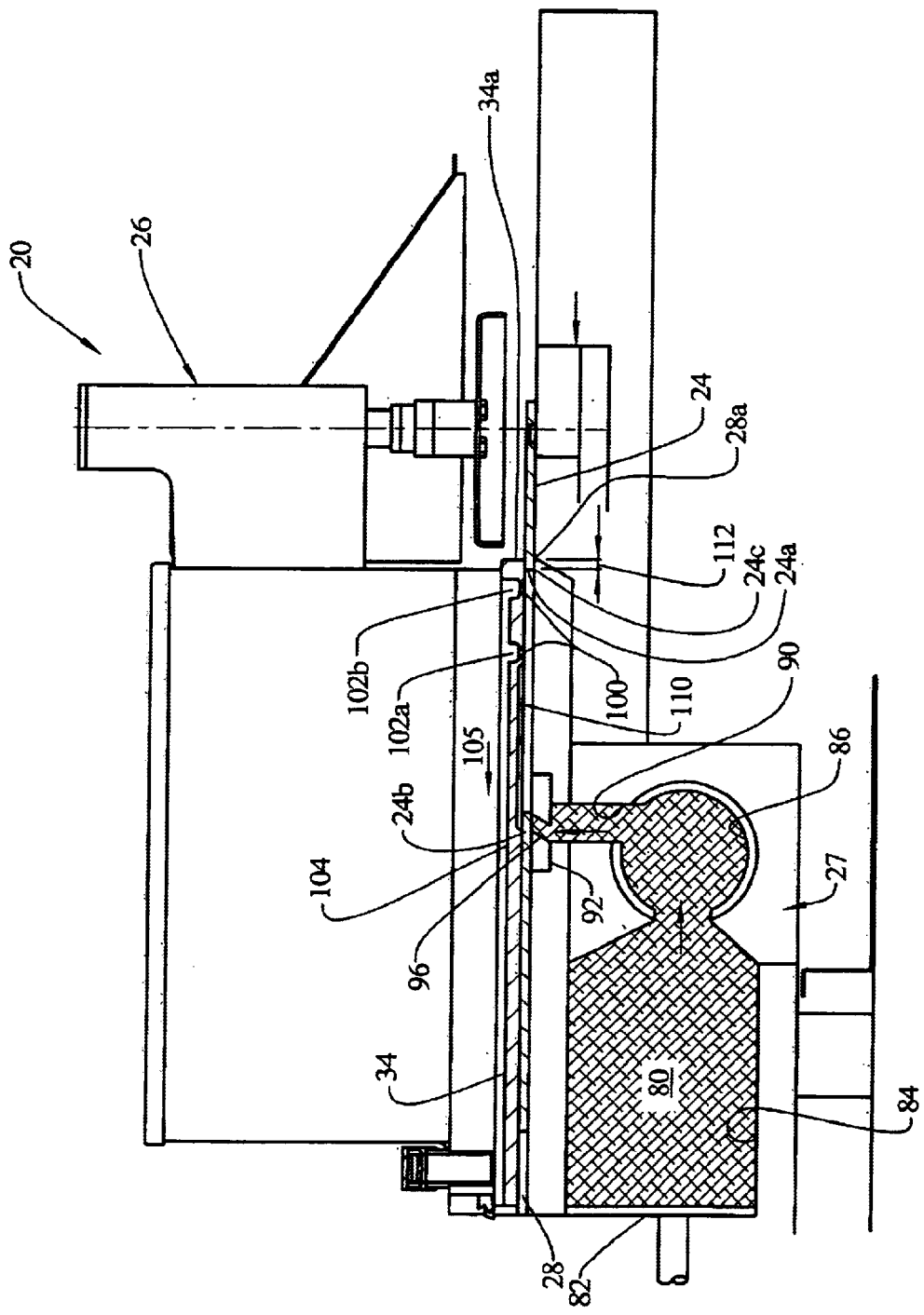
FIG. 1 is a sectional view of the food patty-forming machine of the invention with a mold plate in a seal off position just prior to reaching a start of filling position.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 2:
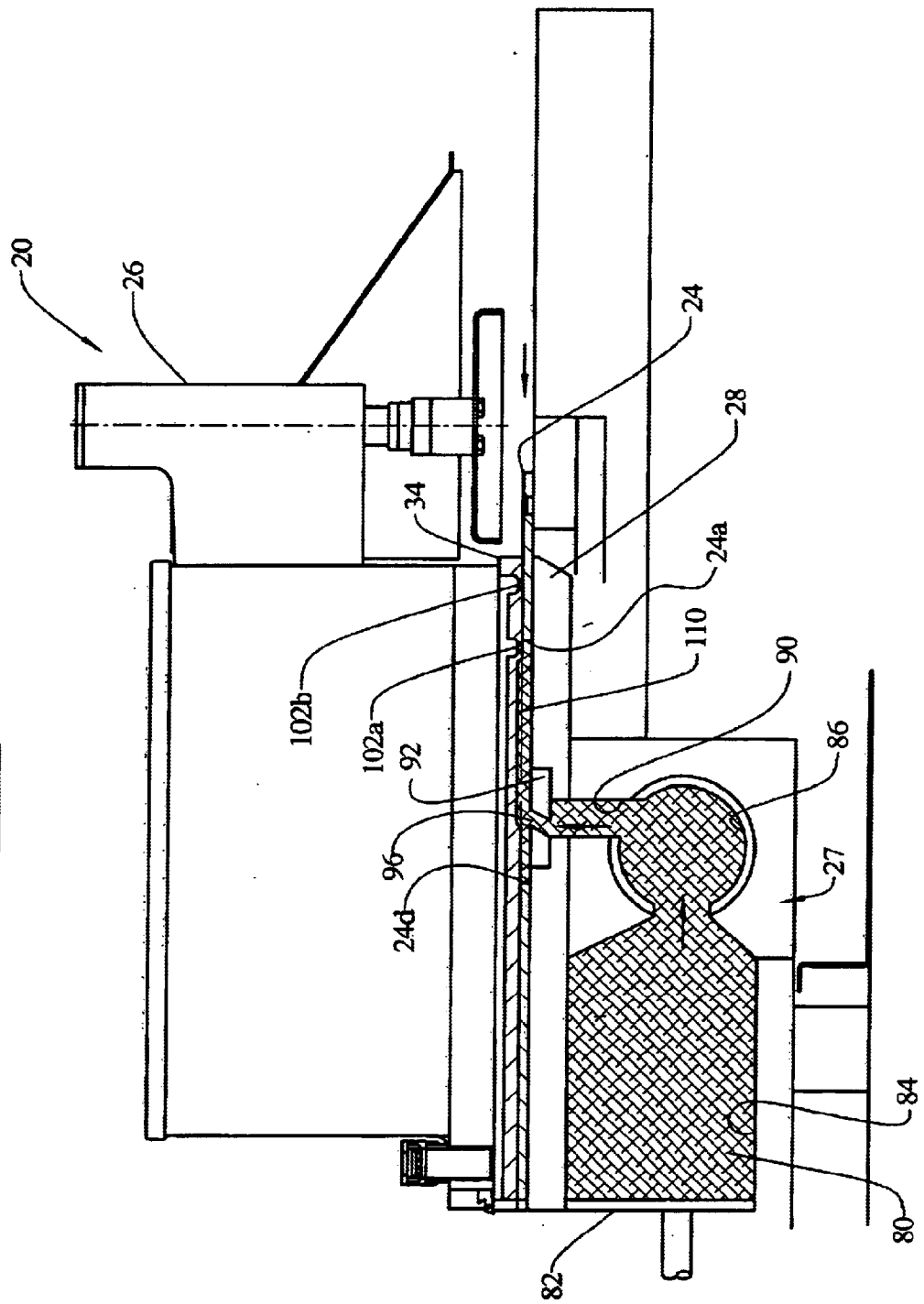
FIG. 2 is a sectional view of the food patty-forming machine of the invention with a mold plate in a fill position.
Figure 3:
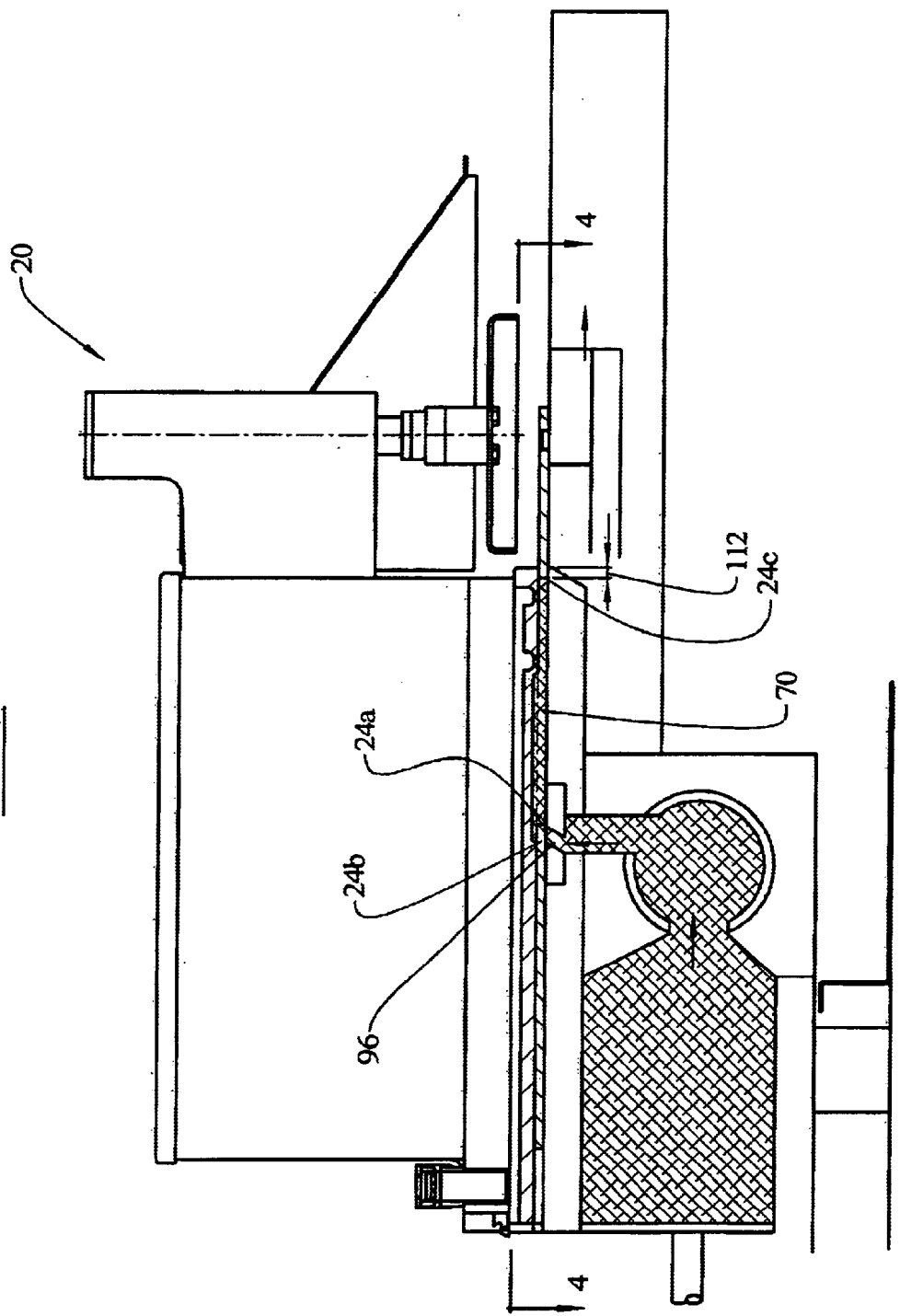
FIG. 3 is a sectional view of the food patty-forming machine of the invention with a mold plate in a seal off position just after leaving an end of filling position.

FIG. 1 illustrates a food patty-forming machine 20 of a type such as described in U.S. Pat. No. 4,329,828, herein incorporated by reference. The machine 20 includes a mold plate 24 driven to reciprocate in a horizontal plane by drive means (not shown), such as by a pneumatic cylinder, or a motor driven, cam-operated, pivoting lever, or other means such as described in U.S. Pat. Nos. 3,952,478; 4,054,967; 4,182,003; and 4,329,828, and PCT published application WO 99/62344, as herein incorporated by reference. The mold plate 24 reciprocates between the positions shown in FIG. 1 and FIG. 5; FIG. 2 and FIG. 3 showing intermediate positions.

Figure 4:
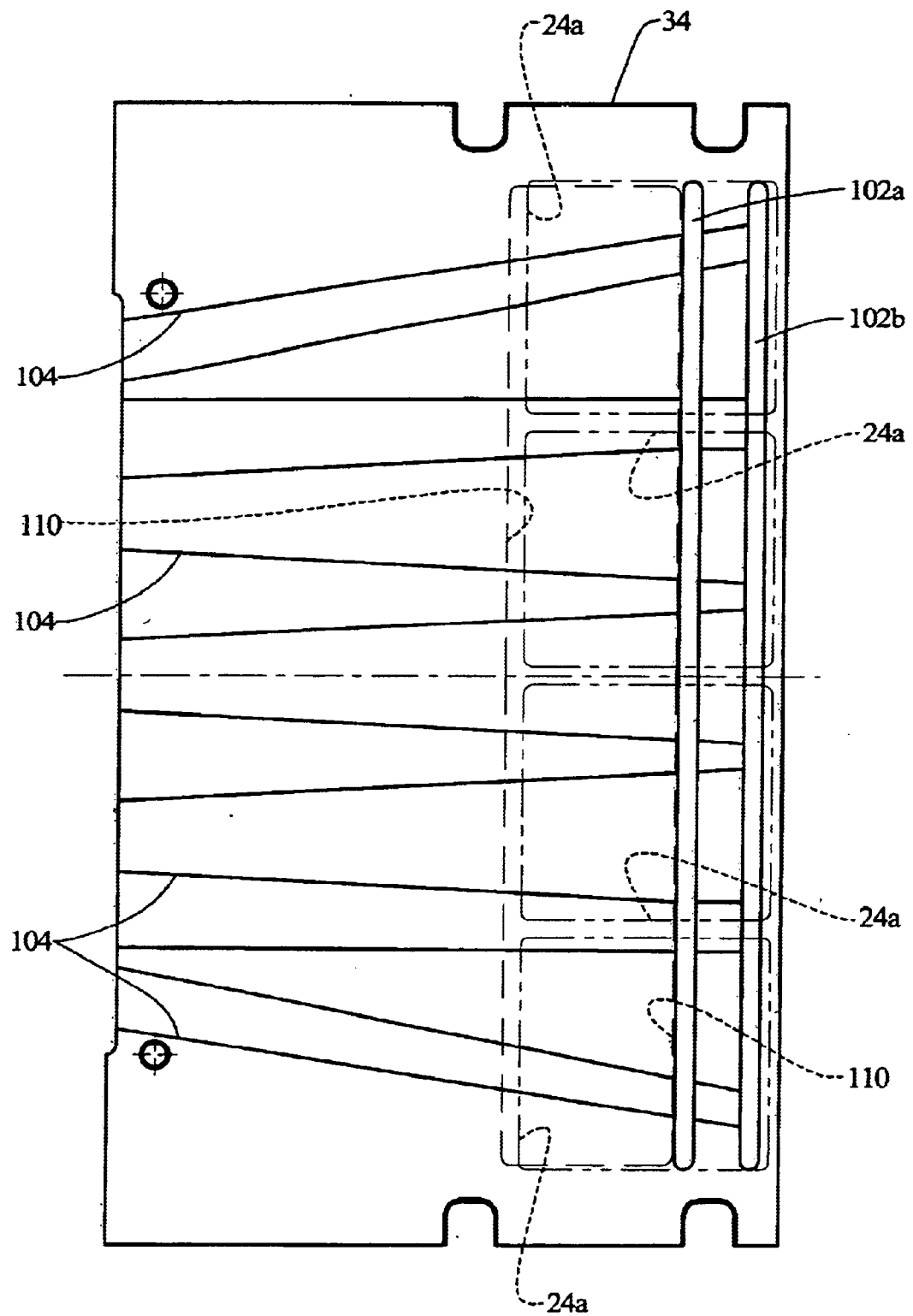
FIG. 4 is a fragmentary, sectional view taken generally along line 4—4 of FIG. 1.

Advantageously, the mold plate 24 includes a plurality of cavities 24a, such as four as shown in FIG. 4, although a single cavity is also encompassed by the invention. The cavities 24a can be any shape, such as round or square, square cavities being illustrated in FIG. 4.

The mold plate is located between a patty knock out apparatus 26 and a food product filling apparatus 27. The mold plate 24 is carried by a machine top plate or support plate 28 and guided on a top side thereof by a breather plate 34. The knock out apparatus 26 is mounted above the breather plate 34.

The food product filling apparatus 27 includes: a plunger 82, a cylinder 84, a manifold 86, a delivery slot 90, and a fill slot insert plate 92 that defines a fill slot 96. Food product 80 is pressurized by the plunger 82 throughout the cylinder 84, the manifold 86, the delivery slot 90, and the fill slot 96.

The breather plate 34 includes a plurality of breather holes 100 located within two air recesses 102a, 102b. The air recesses 102a, 102b allow for easier and more complete cleaning of food particles from the breather holes 100 due to a reduced depth and lowered aspect ratio of the breather holes 100. The air recesses 102a, 102b are open on top to recycle channels 104 which are configured to transport air and small food particles in the direction 105 back to the food product hopper (not shown) or other suitable location. At the position of the mold plate shown in FIG. 1, the breather holes 100 are open between the air recesses 102a, 102b and the cavities 24a.

The mold plate 24 is illustrated in FIG. 1 in a seal off position, moving to the left, just before filling begins, i.e., before the fill slot 96 is in registry with the cavities. Once the fill slot 96 is in registry with the cavities 24a, filling of the pressurized food product into the cavities will begin.

The breather plate further includes a fill recess 110 on a side of the breather plate that faces the cavities 24a. The fill recess 110 is located in part directly over the fill slot 96 and extends longitudinally a substantial portion of the length of the cavities. In the position shown in FIG. 1, the mold plate 24 has a portion 24b adjacent to the cavities 24a that seals the inlet slot 96. As the mold plate 24 moves further to the left, the slot 96 is uncovered by the mold plate 24 and the cavities 24a, and the recess 110, are filled with food product under pressure. Air is exhausted out of the holes 100, through the air recesses 102a, 102b.

In the mold plate position of FIG. 1, with the fill slot 96 sealed, forward edges 24c of the cavities 24a are retracted a margin 112 from the confines of a front edge 34a of the breather plate 34 and a front edge 28a of the support plate 28. This margin can be about 0.3 inches. The margin ensures that before the slot 96 is uncovered, the cavities are no longer located outside the breather plate 34, i.e., are no longer exposed to the atmosphere. The pressurized food product will thus not leak or be sprayed outside the mold plate.

FIG. 2 illustrates the machine 20 of FIG. 1 with the mold plate 24 retracted completely to the left in a cavity fill position. In this position, the cavities 24a are located above the cavity fill slot 96 of the food product filling apparatus 27. Food product 80 is pumped by the plunger 82, through the cylinder 84, and into the manifold 86. Food product 80 passes from the manifold 86 into the delivery slot 90 and out of the fill slot 96.

At the position shown in FIG. 2 the fill recess 110 is within the longitudinal confines of the cavities 24a. A rearward edge 24d of the cavities 24a is behind the fill slot 96. During travel of the mold plate 24 from the position shown in FIG. 1 to the position shown in FIG. 2, the cavity 24a and the recess 110 are filled with food product 80. The recess 110 decreases longitudinal flow resistance by increasing total transverse flow area of the combined cavity 24a/recess 110 to fill food product into the cavity and recess.

For a thin mold plate, such as a 0.25 inch thick or thinner plate, the heretofore known filling arrangement resulted in significant flow resistance, creating elevated pressure requirements to adequately fill the cavities. A fill recess having a depth of about 0.125 inches or greater can significantly decrease the required pressure. By providing the recess and adding to the transverse flow area, according to the present invention, the pressure requirement to adequately fill the cavities can be decreased, resulting in more efficient and reliable machine operation.

FIG. 3 illustrates the mold plate 24 having moved to the right to a seal off position. The mold plate portion 24b has sealed the fill slot 96 and the margin 112 is present. The slot 96 will remain sealed off as the mold plate moves to the right to the knock out position of FIG. 5 and until the mold plate then reverses and reaches a position just past the position of FIG. 1, to the left of the position of FIG. 1.

FIG. 4 Illustrates the breather plate 34 in more detail. The air recesses 102a, 102b extend across a width of the breather plate 34 to effectively vent four cavities 24a of the mold plate 24. Vent holes or breather holes 100 are located in each recess 102a, 102b (not shown) for each cavity 24a. The vent holes 100 are numbered and sized to adequately exhaust air from the cavities during filling, but not sized too large to pass significant amounts of food product. The recycle channels 104 are flow connected to the air recesses 102a, 102b. The fill recess 110 has an elongated rectangular shape and is a common recess for all four cavities 24a. Although a common recess is shown, a separate recess for each cavity 24a is also encompassed by the invention.

Figure 5:
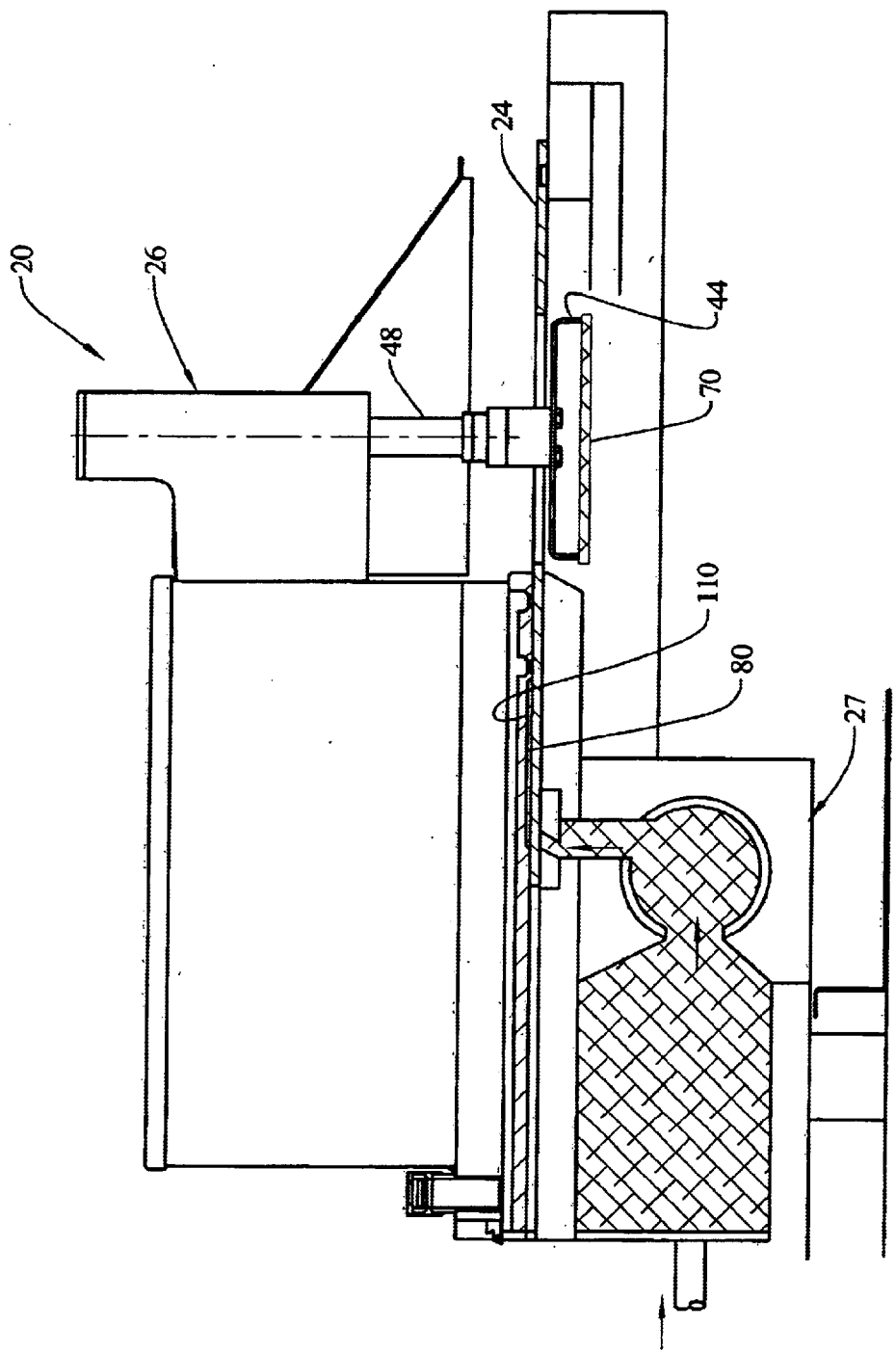
FIG. 5 is a sectional view of the food patty-forming machine of the invention with a mold plate in a patty knock out position.

FIG. 5 illustrates the mold plate 24 at a knock-out position. The knock out apparatus 26 includes at least one knock out pusher 44 that is driven to reciprocate in a vertical direction. The pusher 44 is carried by a knock out rod 48 that is driven by the mechanical system (not shown) of the knock out apparatus 26. A knock out apparatus as described in U.S. Pat. No. 4,329,828, herein incorporated by reference, can be used. The movement of the pusher 44 is adapted and synchronized to register with the mold cavity 24a in the mold plate 24. A food patty 70, formed in the mold cavity 24a, as described below, is thereby pushed from the cavity to be stacked below the mold plate and/or conveyed to a remote location.

Advantageously, the mold plate 24 includes a plurality of cavities 24a, such as four as shown in FIG. 4, and a plurality of pushers 44 are reciprocated together to knock out a plurality of patties 70 from the cavities.

When the mold plate 24 is moved to the position of FIG. 5, food product is trapped in the fill recess 110. On the next filling cycle, this trapped food product will be forced into the cavities 24a.

Although the embodiment described has a breather plate above the mold plate and a fill slot below the mold plate, it is also encompassed by the invention that the breather plate is located below the mold plate and/or the fill slot is located above the mold plate.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. An improved patty-forming apparatus, comprising:
   a mold plate having a mold cavity through a thickness thereof;
   a mold plate support structure carrying said mold plate and guiding said mold plate for reciprocating motion along a longitudinal direction, said structure including a wall facing said mold plate, said mold plate reciprocating along said wall;
   a food product delivery channel carried by said structure and arranged on one side of the mold plate, said delivery channel having a fill opening into said cavity when said mold plate is in a fill position with respect to said structure; and
   said wall including recess means, said cavity open to said recess means when said mold plate is in said fill position, said recess means for increasing a cross sectional food product flow area along the longitudinal direction for filling said cavity with food product from said delivery channel via said fill opening.

2. The apparatus according to claim 1, wherein said wall comprises a breather plate facing said mold plate, said breather plate having at least one breather hole therethrough open to said cavity when said mold plate is in said fill position, said recess means extending along a substantial portion of a longitudinal distance between said fill opening and said breather hole.

3. The apparatus according to claim 2, wherein said breather plate is arranged on an opposite side of said mold plate from said fill opening.

4. The apparatus according to claim 1, wherein said mold plate is arranged to reciprocate between a knock out position located beyond said wall where food product is removed from said cavity, and said fill position, said fill opening closed by said mold plate before said cavity extends beyond said wall, wherein said recess means is closed from said cavity before said mold plate is in said knock out position.

5. An improved patty-forming apparatus, comprising:
   a mold plate having a mold cavity through a thickness thereof;
   a mold plate support structure carrying said mold plate and guiding said mold plate for reciprocating motion, said structure including a wall facing said mold plate said mold plate reciprocating along said wall;
   a food product delivery channel carried by said structure and arranged on one side of the mold plate, said delivery channel having a fill opening into said cavity when said mold plate is in a fill position with respect to said structure; and
   said wall including a recess, said cavity open to said recess and said fill opening when said mold plate is in said fill position;
   wherein said wall comprises a breather plate facing said mold plate, said breather plate having at least one breather hole therethrough open to said cavity when said mold plate is in said fill position; and wherein said recess is formed into said breather plate, said recess being open along a length thereof into said cavity.

6. The apparatus according to claim 5, wherein said mold plate comprises a plurality of cavities across said mold plate and said recess is common to all said cavities.

7. A food patty-forming apparatus, comprising:
   a machine frame;
   a mold plate having at least one cavity and mounted to reciprocate in a longitudinal direction with respect to said frame to position the cavity between a filling position and a patty knock out position;
   a food product delivery channel mounted stationary with respect to said frame and having a fill opening into said cavity when said mold plate is in said filling position;
   a breather plate facing said mold plate and stationary with respect to said frame, said breather plate having a breather hole therethrough located remote from said fill opening, and a fill recess located close to said fill opening, extending toward said breather hole, said fill recess increasing a transverse food product flow area along said longitudinal direction to assist filling of said cavity.

8. The apparatus according to claim 7, wherein said fill opening, said fill recess and said breather hole are all open to said cavity at one time during reciprocation of said mold plate with respect to said frame.

9. The apparatus according to claim 7, wherein said fill opening is closed by said mold plate before said cavity extends beyond said breather plate.

10. The apparatus according to claim 7, wherein said breather plate includes an air recycle channel formed on a side thereof opposite said fill opening, and said breather hole is open between said cavity and said recycle channel.

11. The apparatus according to claim 7, wherein said fill recess is located in part directly facing said fill opening across a thickness of said mold plate.

12. The apparatus according to claim 7, wherein said breather plate is located above said mold plate and said fill opening is below said mold plate.

13. A breather plate for a patty-forming machine, the patty-forming machine having a machine frame, a mold plate having at least one cavity and mounted to reciprocate in a longitudinal direction with respect to said frame to position the cavity between a fill position and a patty knock out position, a food product delivery channel mounted stationary with respect to the frame and having a fill opening into the cavity when the mold plate is in the fill position, a breather plate facing the mold plate and stationery with respect to the frame, the breather plate having a breather hole therethrough, the breather plate comprising:
   a plate having a plurality of breather holes therethrough, and at least one fill recess sized and arranged to be in registry with at least one cavity of a mold plate when said mold plate is in the fill position, said fill recess increasing a transverse food product flow area along the longitudinal direction to assist filling of the cavity.

14. The breather plate according to claim 13, wherein said recess extends transversely and is common to a plurality of cavities when said mold plate is in the fill position.

15. The breather plate according to claim 13, wherein said breather holes are spaced longitudinally from said fill slot and said fill recess extends longitudinally between said fill slot and said breather holes.

16. The apparatus according to claim 5, wherein said recess extends along a substantial portion of a distance between said fill opening and said breather hole.

17. The apparatus according to claim 16, wherein said breather plate is arranged on an opposite side of said mold plate from said fill opening.

18. The apparatus according to claim 17, wherein said mold plate is arranged to reciprocate between a knock out position located beyond said wall where food product is removed from said cavity, and said fill position, said fill opening closed by said mold plate before said cavity extends beyond said wall, wherein said recess is closed from said cavity before said mold plate is in said knock out position.

19. The apparatus according to claim 18, wherein said mold plate comprises a plurality of cavities across said mold plate and said recess is common to all said cavities.

20. The apparatus according to claim 19, wherein said fill opening is closed by said mold plate before said cavity extends beyond said breather plate.

* * * * *